Sept. 10, 1963 P. SMITH 3,103,214
PHOTOELECTRIC TRANSDUCER
Filed April 10, 1962
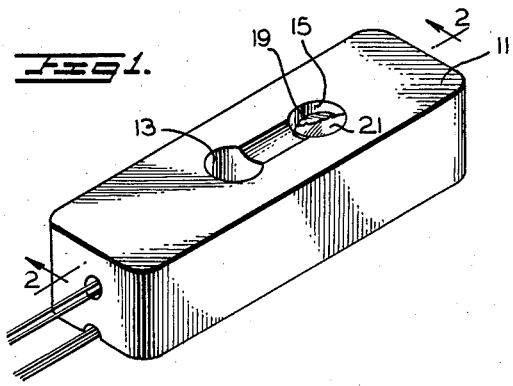
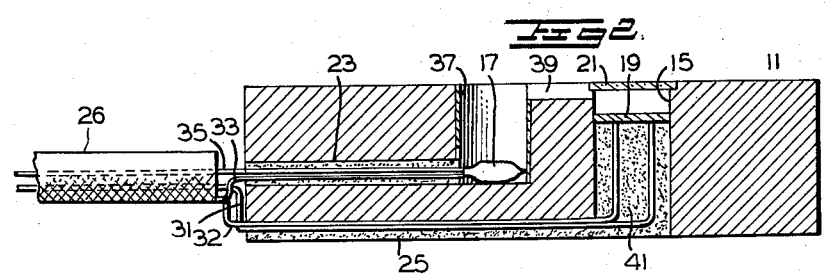
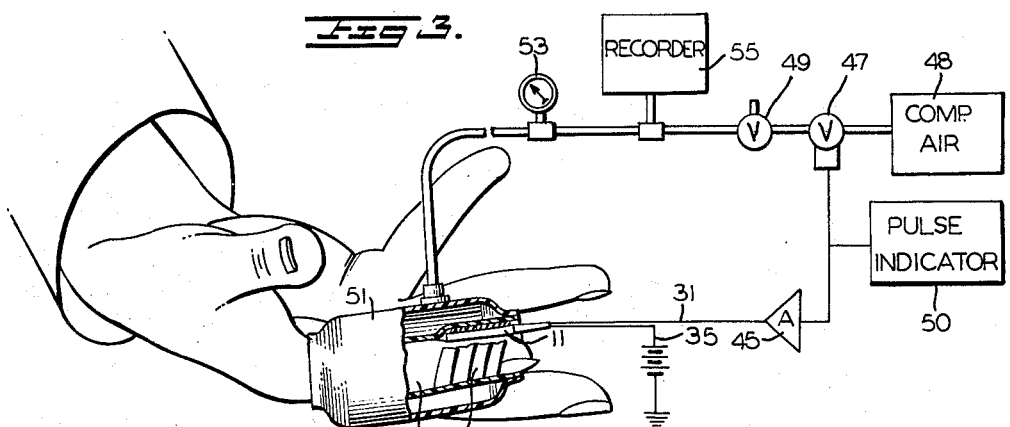
INVENTOR
PETER SMITH

United States Patent Office 3,103,214
Patented Sept. 10, 1963

3,103,214
PHOTOELECTRIC TRANSDUCER
Peter Smith, Glendola, N.J., assignor to Dynamics Corporation of America, New York, N.Y., a corporation of New York
Filed Apr. 10, 1962, Ser. No. 186,431
2 Claims. (Cl. 128—2.05)

This invention relates generally to a blood pressure transducer and more specifically to a photoelectric transducer for measuring the amount of blood in the digit for purposes of determining blood pressure within the body.

There are several known means for measuring blood pressure within the human body for medical purposes. One of the more recent means for measuring blood pressure has been the digital transducer wherein the pressure within a digit may be measured and used with equipment which will continually indicate or record the changes in such blood pressure. One of the advantages of using a digital transducer is that the transducer and associated finger cuff may remain on a digit for a long period of time without presenting any danger or discomfort to the patient. Most of the digital transducers in use today are of the electromechanical type wherein the pulsations in the artery within the digit are translated into electrical signals by means of an electromechanical transducer.

One of the major problems involved in the use of electromechanical transducers is the presence of extraneous signals caused by movement of the digit itself. These extraneous signals are known as artifact and will be referred to hereinafter by that term. Various types of transducers and associated electrical circuitry have been developed with a view to reducing this artifact in order that a more exact signal may be available for determining the variations in blood pressure. However, this has led to an increase in the size of the transducer itself and additional complicated electrical circuitry.

Another type of transducer has been used which involves a photoelectric cell and associated light source for determining the blood pressure through a measurement of the change in the amount of blood in the tissue of the digit. These transducers have been used in a manner such that the light source is placed on one side of the digit and the photocell is placed on the opposite side of the digit. Arterial pulsations rapidly force blood into the tissue of the digit and this blood leaves the digit comparatively slowly through the veins. Accordingly, the amount of blood in the tissue of a digit increases with each arterial pulsation, reducing the intensity of the light reaching the photocell from the light source. This variation in light intensity in turn varies the resistance of the photocell and may be used in connection with automatic controls for variation of digital restricing means, such as cuff pressure to give an indication of the blood pressure of the subject. This type of blood pressure measurment has several inherent disadvantages. Since the measurement through a digit will vary with the differing sizes of the digits, any circuitry or indicating devices must be adjusted for various patients in order to obtain a true picture of the blood pressure. Additionally, it can be seen that two separate devices are required in that the photocell and the light source must be on opposite sides of the digit resulting in a rather bulky device which is difficult to adjust and fit properly.

The present invention relates to an optical transducer for measuring the amount of blood in the tissue of a digit wherein a light source and a photocell are mounted in close proximity in the same housing. The photocell measures the light which passes into the tissue of the digit from the light source and is reflected from the digit back to the photocell. This type of device eliminates the problem of change in size of the digit and reduces the overall size of the transducer equipment to a minimum and additionally provides an instrument which may be used quickly and easily.

Accordingly, an object of this invention is to provide a transducer for measuring blood pressure within a digit.

Another object of this invention is to provide an optical transducer for detecting the change in the amount of blood in the tissue of a digit.

Yet another object of this invention is to provide a photoelectric transducer which has an output indicative of the amount of blood in the tissue of a digit.

A further object of this invention is to provide a blood pressure transducer which is free from artifact.

A still further object of this invention is to provide a photoelectric transducer for measuring blood pressure which is economical to produce and is of a small physical size.

A further object of this invention is to provide a method for continuous indication of blood pressure activities.

These and other objects will become apparent from the following description when taken in conjunction with the drawings wherein:

FIG. 1 is a perspective view of the transducer of the present invention;

FIG. 2 is a sectional view taken along the lines 2—2 of FIG. 1; and

FIG. 3 is a diagrammatic representation of the transducer and associated equipment used for following the blood pressure within the digit.

Turning now more specifically to the drawings, a housing 11 contains a recess 13 and an adjacent recess 15 substantially centrally located in one face of the housing. Within the recess 13, a light source 17 is located, and within the recess 15, there is a photoelectric cell 19. A red filter 21 may be placed over the photoelectric cell 19 and electrical leads extend outwardly from the housing to provide the necessary connections to the light source and photoelectric cell.

As indicated in the illustrative example, FIG. 2, the housing 11 may be a solid block of any substantially rigid material. Although a dielectric material may be used, it has been found that it is advantageous to use a heat conducting material such as aluminum in order to conduct the heat generated by the light source 17 away from the digit when the transducer is in place.

A borehole 15 is drilled through the housing 11 and a similar borehole 13 is drilled in the housing in closely spaced relationship with the borehole 15. The borehole 13 does not extend entirely through the housing 11 but is joined to a channel 23 which extends outwardly through the end of the housing 11.

The channel 23 is large enough to allow passage of a small light source 17 such as a peanut bulb. The photoelectric cell which is substantially the same diameter as the borehole 15 is placed therein and a channel 25 may be cut in the housing 11 so that the leads 31, 32 from the photocell may be extended outwardly from the housing. In order to hold the photocell and the leads in place, the borehole 15 and channel 25 may be filled with an insulating material such as an epoxy resin. Lead 32 of the photocell may be connected to lead 33 from the light source 17 and the comon lead then connected to the outer shield of the cable 26. The leads 31 and 35 are then carried within the cable to appropriate exterior connections.

Although it has been found that the transducer as thus far described provides a pulse indication, several additional improvements have been added to the basic transducer. The light source is recessed in the block in order to prevent any possibility of discomfort to the patient because of burning or excessive heating of the digit when the transducer is in place. Accordingly, in order to improve the light output to the digit the walls of the borehole 13 may be coated with a white material 37 such as paint. Additionally, it has been found that, in some cases, exterior light may pass into the outer end of the digit and be reflected so as to effect a response in the photocell 19. Since the photocell is of a material such as cadmium selenide and is chosen to be responsive in the red region of the spectrum, a red filter 21 may be placed above the photocell. It has been found that the insertion of the filter eliminates or substantially reduces any exterior light which may pass into the digit and be reflected to the photocell.

Further experiments have shown that the ridge which would normally exist between the two boreholes containing the light and the photocell has a tendency to constrict the digit at that point and prevent blood from passing into the tissue beyond such a ridge. Accordingly, this area may be grooved as at 39 in order to reduce the pressure on the digit between the two boreholes and allow the blood to pass freely into the tissue therebetween, thus giving a uniform color within the digit between the light source and the photocell.

The transducer as shown in FIGS. 1 and 2 and described above may be used to indicate the existence of an arterial pulse together with the pulse repetition rate and pulse amplitude if the transducer is secured to a digit, by means such as tape, and coupled to an amplifying device for actuating an indicating device, such as a pulse indicator 50 which may be an ammeter, oscilloscope or the like.

Since the photocell is responsive to light in the red region of the spectrum, any increase in the redness of the digit will result in a proportional signal output of the photocell. Accordingly, arterial pulsations which drive blood into the digit result in an increased redness of the digit momentarily until the blood is carried away from the digit through the veins. The response of the photocell, therefore, is a direct indication of the existence of a pulse and also of the pulse repetition rate.

FIG. 3 is a diagrammatic representation of the use of the device of the present invention in an automatic blood pressure following system. Such a system is shown and described in detail in copending application Serial No. 58,115, filed September 23, 1960, entitled, "Blood Pressure Follower," filed in the name of John H. Green. Reference is hereby made to that application for specific details of the system.

The housing 11 is secured to the digit 42 by means such as tape 43 with the face having the boreholes pressed against the digit. The leads 31 and 35 extend outwardly to an amplifier 45 and a source of power by means such as a cable. The amplified signal actuates a normally closed solenoid valve 47 for opening an air line from a compressed air source 48. When the solenoid valve is open, air passes through relief pressure valve 49 to inflate the cuff 51 in the standard manner. The gauge 53 and recorder 55 are connected to the air line which inflates the cuff 51.

In operation, the solenoid valve opens in response to a signal from the transducer and the cuff begins to inflate, constricting the entire digit. As the pressure is increased about the digit the arterial pulsations which drive the blood towards the outer extremities of the finger are gradually reduced and the pressure within the cuff eventually prevents the blood from flowing into the end of the digit, thus preventing an increase in the amount of blood in the tissue of the digit. As the amount of blood in the tissue decreases, the light from source 17 which reaches the photocell 19 is reflected from a relatively "white" digit and the resistance of the photocell decreases. Accordingly, the signal output to amplifier 45 is decreased until the signal from the photocell is no longer of a sufficient amplitude to open the solenoid valve 47. Valve 49 provides a slow leak from the cuff and, with the solenoid valve closed, the pressure in the cuff begins to reduce until a pressure point is reached which again allows the blood to flow outwardly to the extremity of the digit. As the blood again begins to flow within the digit, the resistance of the photocell increases in accordance with arterial pulsations and the signal from the photoelectric transducer activates the solenoid valve, and the valve opens intermittently, inflating the cuff and the cycle repeats itself. Accordingly, pressure in the cuff will vary in accordance with the varying amount of blood in the tissue of a digit, and the blood in the tissue of the digit will only increase when the arterial pressure is sufficient to overcome the constricting pressure of the cuff. Thus, the pressure indication on the gauge 53 and recorder 55 will fluctuate slightly above and below that pressure which is required to prevent arterial flow into the digit. Accordingly, a system has been provided which continuously follows arterial pressures and any changes occurring therein.

I claim:

1. A digital transducer for detecting arterial pulsations comprising a substantially rectangular shaped housing, a light source within said housing, a first recess extending from said light source to one face of said housing, a photoelectric cell within said housing, a second recess extending from said cell to said one face of said housing, an arcuate groove in said one face of said housing extending between said first and second recess, a red light filter in said second recess between said cell and said one face of said housing, a light reflecting coating within said first recess, means extending into said housing for supplying power to said light source and means connected to said photoelectric cell for transmitting signals therefrom.

2. A transducer for detecting arterial pulsations within a digit comprising, a substantially rectangular housing, a light source within said housing, a first borehole extending from said light source to one face of said housing, a photoelectric cell within said housing, a second borehole substantially parallel to said first borehole extending from said cell to said one face of said housing, an arcuate groove in said one face of said housing extending between said first and second boreholes, a red filter extending across said second borehole between said cell and said one face of said housing, a light reflective coating on the inner surface of said first borehole, means extending outwardly of said housing for supplying power to said light source and means connected to said cell for transmitting signals therefrom.

References Cited in the file of this patent

UNITED STATES PATENTS 3,040,737     Kompelien _____ June 26, 1962